Figure 1:
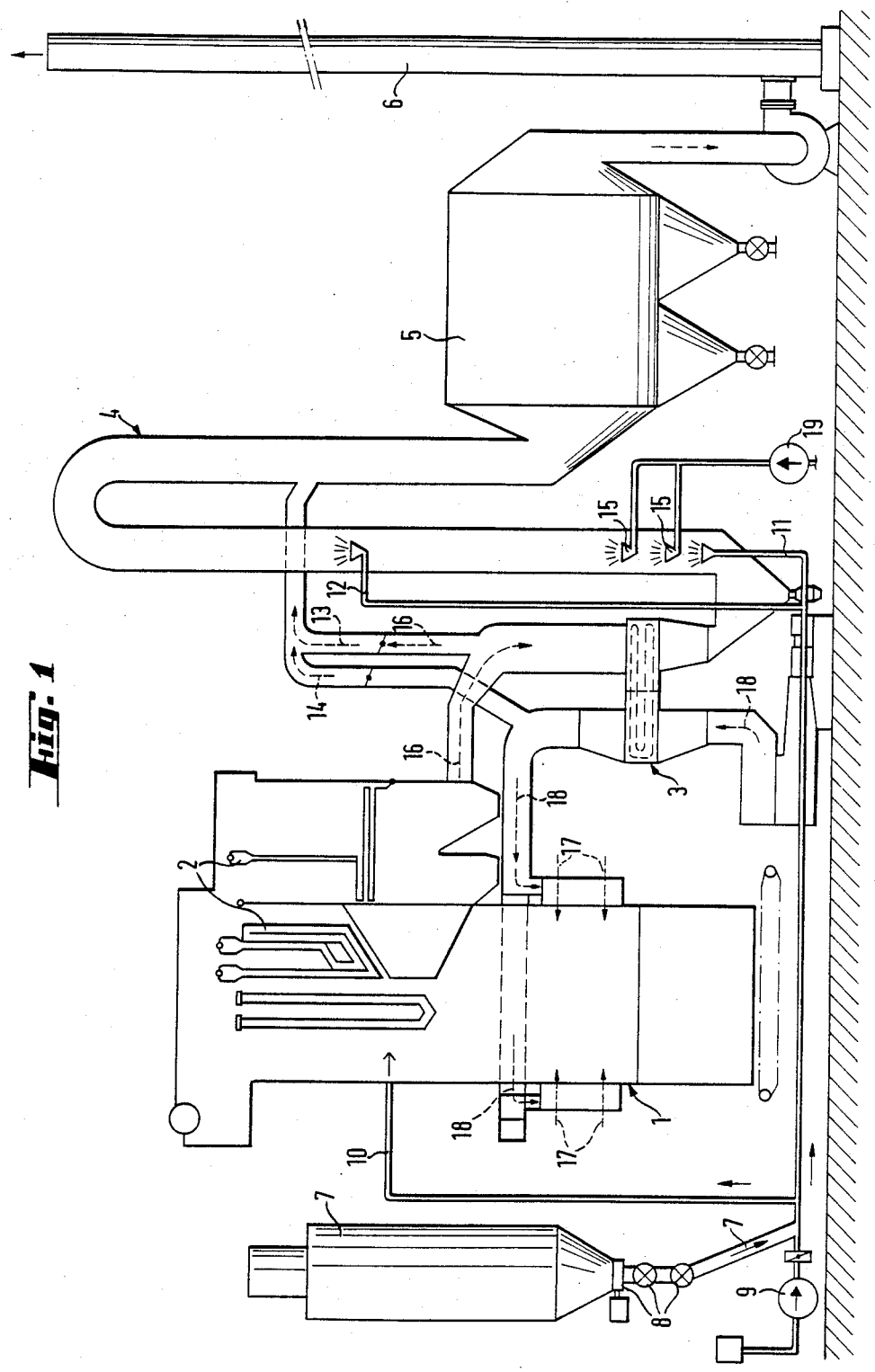

United States Patent [19]

Hämälä et al.

[11] Patent Number: 4,788,047

[45] Date of Patent: Nov. 29, 1988

[54] PROCESS FOR CAUSING THE GASEOUS SULFUR COMPOUNDS OF FLUE GASES TO REACT TO FORM SOLID COMPOUNDS WHICH CAN BE SEPARATED FROM THE FLUE GASES

[75] Inventors: Sirpa Hämälä; Timo Kenakkala; Pentti Janka; Tuomo Ruohola, all of Tampere; Martti Lehtimäki, Sarkola, all of Finland

[73] Assignee: Oy Tampella AB, Tampere, Finland

[21] Appl. No.: 795,251

[22] Filed: Nov. 5, 1985

[30] Foreign Application Priority Data

Apr. 24, 1985 [FI] Finland ................................. 1624

[51] Int. Cl.$^4$ ........................... B01J 8/00; C01B 17/00
[52] U.S. Cl. ..................................... 423/244; 423/242
[58] Field of Search .......... 423/244 A, 244 R, 242 A, 423/242 R

[56] References Cited

U.S. PATENT DOCUMENTS

| | | | |
|---|---|---|---|
| 3,411,864 | 11/1968 | Pallinger ............................ | 423/242 |
| 3,520,649 | 7/1970 | Tomany et al. ..................... | 423/242 |
| 4,519,995 | 5/1985 | Schrofelbauer et al. ........... | 423/242 |
| 4,555,390 | 11/1985 | Bhatia ................................. | 423/244 |
| 4,559,211 | 12/1985 | Feldman et al. ................... | 423/244 |
| 4,562,054 | 12/1985 | Bhatia ................................. | 423/244 |

*Primary Examiner*—Gregory A. Heller
*Attorney, Agent, or Firm*—Cushman, Darby & Cushman

[57] ABSTRACT

The invention relates to a process and apparatus for causing the sulfur dioxide of flue gases to react to form solid sulfates and sulfites which can be separated from the flue gases. Sulfur dioxide containing flue gases (16) are directed according to the invention into one end of an oblong reaction zone (4), in addition to which pulverous calcium compounds and water are directed separately into the reaction zone at several points, and finally from the opposite end a flue gas suspension is withdrawn and directed to dust separation (5). By feeding the pulverous reagent and the water separately into the reactor 4, the problems involved in the preparing, handling and spraying of an aqueous slurry are avoided, in addition to which the retention time and the reaction conditions can be regulated easily in the oblong reactor 4.

9 Claims, 2 Drawing Sheets

PROCESS FOR CAUSING THE GASEOUS SULFUR COMPOUNDS OF FLUE GASES TO REACT TO FORM SOLID COMPOUNDS WHICH CAN BE SEPARATED FROM THE FLUE GASES

The present invention relates to a process for causing the gaseous sulfur compounds of flue gases, especially sulfur dioxide, to react to form solid compounds separable from the flue gases. In addition, the present invention relates to an apparatus for carrying out the process mentioned above.

When sulfur-containing fuel such as coal or oil is burned in a furnace, sulfur compounds, especially sulfur dioxide, hazardous to the environment, are formed. Nowadays, increasing attempts have been made to develop processes for the purification of flue gases, whereby $SO_2$ is bound to calcium compounds.

In known methods, calcium, in the form of either carbonate or hydroxide, is sprayed as an aqueous slurry into a reactor at a point after the furnace. The former process is called the wet lime method and the latter the semi-dry method. The reactor is typically a rather large vessel, and the aqueous slurry is sprayed downwards from the upper part of the vessel. The hydraulic diameter of the reactor is greater than the diameter of the flue gas conduit, and therefore the velocity of the flue gases decreases when they enter the reactor. The ratio of the reactor height/length to the hydraulic diameter ($h/d_{hydr}$) is small, in known systems typically in the order of 2–5. In this case approximately constant conditions prevail in the reactor chamber, since radiation and turbulence level out the conditions, all of the reaction steps thus taking place under similar conditions.

The system mentioned above has the disadvantage that it requires devices for the preparation and handling of slurry, which considerably increases the investment cost. In addition, the feeding of the slurry into the reactor is very disturbance-prone, causing interruptions and disturbances in production. The regulating of the spraying of the aqueous slurry requires great precision, since drops which are too large remain in liquid form on the reactor bottom. The aim is to maintain the thickness of the aqueous slurry of calcium hydroxide so great that the heat present in the flue gases will suffice to evaporate the water entering the reactor, so that the product of absorption can be recovered in the form of dry powder. In this case, however, the nozzles tend to get clogged easily and it is difficult to regulate the drop size during the spraying.

The object of the present invention is to provide a process and apparatus for causing the gaseous sulfur compounds, in particular sulfur dioxide, present in flue gases to react to form solid compounds which can be separated from the flue gases and thereby be effectively removed from the flue gases of the furnace in a simple and economical manner.

The main characteristics of the invention are given in the accompanying claims.

In a manner contrary to the said prior known systems, the velocity of the flue gases which contain gaseous sulfur compounds is not allowed to decrease significantly in the reactor, but the flue gases are directed through an oblong reaction zone, in which the velocity of the flue gases remains more or less unchanged and over the length of which the retention time of the reaction is adjusted, and at the same time the progress of the reaction can be regulated effectively by feeding one or more pulverous reagents into the flue gas flow at one or more points along the length of the reaction zone.

In a manner contrary to the above-mentioned prior known solutions, the reagent which reacts with the gaseous sulfur compounds of the flue gases is not fed into the reaction zone in the form of an aqueous slurry, but the water is fed in the form of either a water spray or steam into the reaction zone, separately from the reagent, which is fed in the form of powder into the reaction zone. In this manner the problems involved in the preparing and handling of the aqueous slurry and in spraying it through nozzles into the reactor are eliminated. The feeding of water and/or steam and a pulverous reagent into the reactor separately is technically straightforward and inexpensive to implement. The maintenance and servicing of such apparatus is also uncomplicated and does not require large personnel for the care of the apparatus.

The flue gases fed in at one end of the oblong reaction zone may already contain a pulverous alkali metal oxide or hydroxide and/or earth alkali metal oxide and/or hydroxide in powder form, or water in spray form and/or steam, water and/or steam being fed respectively into the reactor and/or a pulverous alkali metal and/or earth alkali metal oxide and/or hydroxide being fed into the reactor at one or more successive points. Alternatively or additionally it is, of course, possible for the pulverous oxide and/or hydroxide and the water and/or steam to be fed separately from each other into the reactor itself, also at the same point but separately. Instead of only water it is also possible to spray in a dilute calcium or magnesium hydroxide emulsion.

In one preferred case a pulverous oxide and/or hydroxide is fed into the reaction zone at at least two successive points, in which case water and/or steam can be fed into the reaction zone at a point between these successive feeding points or at the same point of the reactor at which the pulverous agent is fed in.

In addition to the reagents and water mentioned above it is possible to feed into the reaction zone oxygen or an oxygen-containing gas, in this case preferably pre-heated, to the end part of the reaction zone in order to cause the sulfite produced in the reaction to react further to form sulfate. At the same time it is possible advantageously to feed into the end part of the reaction zone hot flue gases in order to raise the temperature of the gases in the end part of the reactor before dust separation.

The temperature of the flue gases fed into the reaction zone is 50°–800° C., preferably 90°–200° C.

The pulverous reagent fed into the reaction zone is preferably calcium oxide and/or hydroxide, which can be derived from the calcium carbonate fed into the furnace, the calcium carbonate breaking down in the furnace into calcium oxide, which can further form calcium hydroxide if water and/or steam is fed into the furnace. The carbonate can be fed into the furnace either in the form of dry powder or in some cases also slurried in water.

In a manner deviating from the above-mentioned known solutions, in the apparatus according to the present invention an oblong reactor, such as a tubular reactor, is used, the ratio of its length to its hydraulic diameter being great, typically about 10 or even greater. In this reactor the velocity of the flue gases does not decrease considerably but remains so high that the gaseous and solid materials participating in the reaction are captured and carried along with the flue gases. The necessary retention time can be regulated by means of the reactor length, and at a point after the reactor the dust-like or spray-like substances are either separated from the flue gases in a separate separator or they are allowed to separate in the conventional dust separator 5 of the furnace. By 'hydraulic diameter' is meant in this context the cross sectional area of the reactor.

An oblong reactor such as this provides the further advantage that the reactor conditions settle at different values, or can even be adjusted to different values, in the different parts of the reactor. For example, the temperature may vary accordingly as heat of reaction is released or the vaporization of water binds heat. Thus the operation of the process can be optimized in the desired manner.

An oblong reactor can be made to be a fixed structure in connection with a furnace which burns sulfur-containing fuels, for example in such a way that the reactor is built inside the furnace structure, or outside it between the thermal surfaces of the furnace and the dust separator. The reactor can also be constructed to be completely separate from the furnace, in which case the oxide is fed in separately into the flue gas conduit and not into the furnace, and in which case it requires a separate dust separator. This procedure provides the advantage that the fly ash and the produced sulfate/sulfite mixture can be separated from the flue gas flow.

Figure 2:
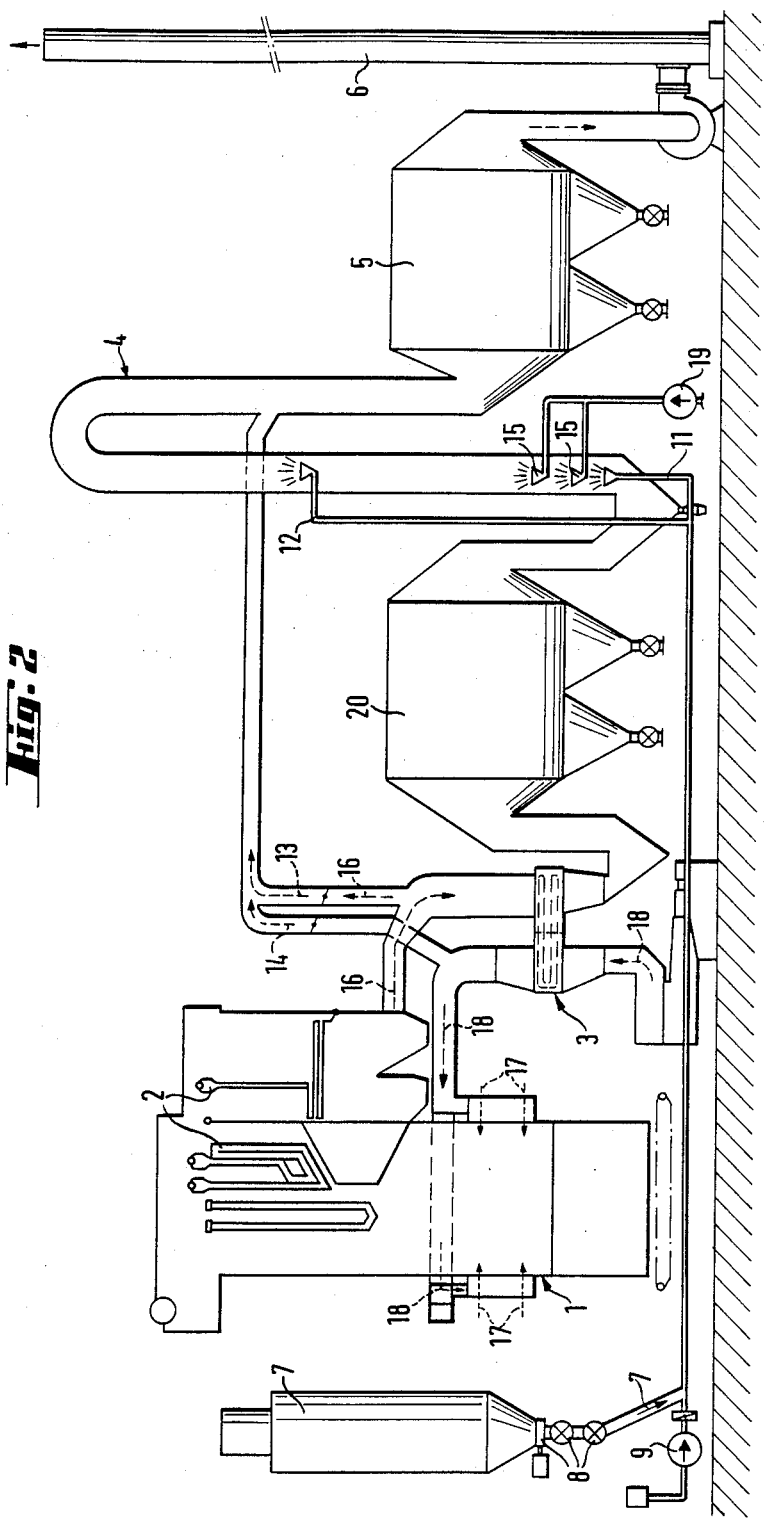

The invention is described below in greater detail with reference to the accompanying drawings, in which FIG. 1 depicts a diagrammatic cross sectional side view of a preferred embodiment of the invention, and FIG. 2 depicts a diagrammatic cross sectional side view of another embodiment of the invention.

In the drawing, reference numeral 1 indicates the hearth of the furnace, in which a sulfur-containing fuel 17 is burned, usually with air 18. The sulfur dioxide containing flue gases 16 cool on thermal surfaces 2 in the furnace and in the pre-heater 3 for air 18. At a point subsequent to the furnace 1 the flue gases are directed according to the invention into an oblong reactor 4, which is followed by a dust separation system 5 and a flue 6.

The reagent, preferably calcium carbonate, intended for binding the sulfur dioxide, is fed from the storage vessel 7 by means of batch feeders 8 into the air flow of a pneumatic air-conveying blower 9, from which it is blown into the upper part of the furnace 1 through the conduit 10 and/or through the conduit 11 of the first part of the reactor 4, and possibly also to some subsequent point of the reactor 4 through the conduit 12. In addition, water is sprayed into the oblong reactor 4 through the nozzles 15, either only at the beginning or at several points along the length of the reactor. In addition, it is possible to feed into the reactor 4 at an appropriate point warm air through the conduit 14 or flue gases through the conduit 13 in order to raise the temperature of the flue gases in the end part of the reactor before the dust separator 5.

The reagent is preferably fed in in excess in proportion to the amount of sulfur contained in the fuel 17, and it can be fed either directly into the furnace 1 through the pipe 10 and/or directly into the reactor 4 at one or several points 11, 12. Preferably at most 50% of the total amount of the reagent is fed in through the pipe 12.

By means of the pump 19 the amount of the water fed in through the nozzles 15 is adjusted preferably at maximum to such a rate that it will vaporize as completely as possible in the heat of the flue gases 16. When necessary, however, the temperature of the flue gases can be raised in the reactor 4 by feeding into the end part of the reactor 4 hot flue gases 16 as a bypass-flow through the conduit 13.

In FIG. 2 the reference numerals indicate the same items as the respective numerals in FIG. 1. The alternative according to FIG. 2 deviates from that of FIG. 1 in that the reactor has been installed in the furnace only at a point subsequent to the separator of the fly ash from the flue gases, usually an electrofilter 20. Thus the fly ash and respectively the calcium compounds obtained as reaction products can be substantially separated from each other, since the fly ash has been separated at a point before the reactor and the reagent, preferably calcium oxide, is fed into the reactor only after the separation of the fly ash. At a point subsequent to the reactor there is, of course, a separate separator for solids, which can be a conventional electrofilter or some other suitable separator.

Instead of calcium carbonate or oxide it is possible to feed into the furnace 1 or reactor 4 some other oxide, or into the furnace an alkali metal and/or earth alkali metal carbonate, such as calcium-magnesium carbonate, which breaks down into oxide in it. Although the process and the reactor operate well with one single reagent, such as calcium carbonate or oxide, it is possible to use in the apparatus simultaneously several different reagents in order to make use of economically available reagent materials. In this case the reagents can be fed into the reactor either mixed with each other at the same feeding point or at the same feeding points, or different reagents can be fed at different points according to need. The calcium oxide is derived from calcium carbonate or calcium-magnesium carbonate, which has broken down into oxide and carbon dioxide upon having been fed into the furnace.

The invention is described below in greater detail with the aid of examples.

EXAMPLE 1

A reactor having a cross-sectional area of about $(0.4 \times 0.4) m^2$ and a length of about 20 m was experimented with. Flue gases which contained mainly a calcium-oxide-containing dust and about 900 ppm $SO_2$ were blown at different temperatures into the reactor. In addition, water was sprayed into the reactor.

The calcium oxide and water present in the flue gases form calcium hydroxide, which being highly reactive reacts with the oxides of sulfur.

$$CaO + H_2O \rightarrow Ca(OH)_2$$

$$Ca(OH)_2 + SO_2 \rightarrow CaSO_3 + H_2O \qquad (1)$$

The conditions in the reactor and the results of the reaction (analysis) are shown in Table 1, the first column of which shows the rate of calcium oxide determined as a molar proportion of calcium to sulfur, the second column the temperature of the flue gas fed into the reactor, the third column the temperature of the flue gas upon its leaving the reactor, the fourth column the reduction of the sulfur dioxide in percent, the fifth column the proportion of the fly ash in the solids in percent, the sixth column the joint proportion of calcium sulfite and calcium sulfate in the solids in percent, and the seventh column the proportion of other compounds in the solids.

TABLE 1

| Ca/S | T in | T out | SO₂ reduction | fly ash | CaSO₃/CaSO₄ | Other compounds |
|---|---|---|---|---|---|---|
| 0.52 | 50° C. | 65° C. | 56% | 76% | 23% | 1% |
| 1.56 | 90 | 68 | 82 | 61 | 26 | 13 |
| 2.20 | 200 | 72 | 87 | 51 | 24 | 25 |
| 2.22 | 120 | 62 | 96 | 53 | 26 | 21 |
| 2.3 | 110 | 68 | 93 | 53 | 25 | 22 |
| 4.0 | 120 | 68 | 98 | 43 | 20 | 37 |
| 4.1 | 800 | 110 | 72 | 38 | 15 | 47 |

EXAMPLE 2

Flue gases from which the fly ash has been separated separately by means of an electrofilter are fed into a reactor according to Example 1, and the calcium oxide is fed into the flue gases at a point subsequent to the electrofilter prior to the reactor. Table 2 shows the research results pertaining to the reaction, in which the amount of calcium oxide is expressed as a molar proportion of calcium to sulfur, and the percentages of calcium sulfite and calcium sulfate and the total percentage of the other compounds, present in the solids formed in the reaction, are shown in separate columns. The in and out temperatures of the reactor and the reduction value of the sulfur dioxide in percent are shown in a manner corresponding to Table 1.

TABLE 2

| Ca/S | T in | T out | SO₂ reduction | CaSO₃ | CaSO₄ | Other compounds |
|---|---|---|---|---|---|---|
| 1.56 | 90° C. | 68° C. | 82% | 44% | 21% | 35% |
| 2.22 | 120 | 68 | 93 | 36 | 17 | 47 |
| 4.0 | 120 | 68 | 98 | 23 | 11 | 61 |

EXAMPLE 3

Calcium oxide is fed into the reactor in accordance with Example 2 at a point subsequent to the electrofilter, but at a point subsequent to the reactor an oxidizing material or an oxygen-bearing gas such as air is added to the flue gases, whereupon the calcium sulfite oxidizes to sulfate. The reaction results and the conditions are shown in Table 3 in a manner corresponding to Tables 1 and 2.

TABLE 3

| Ca/S | T in | T out | SO₂ reduction | CaSO₃ | CaSO₄ | Other compounds |
|---|---|---|---|---|---|---|
| 1.56 | 90° C. | 68° C. | 82% | 1.4% | 65% | 33% |
| 2.22 | 120 | 68 | 93 | 0.8 | 53 | 46 |
| 4.0 | 120 | 68 | 98 | 0.8 | 35 | 64 |

We claim:

1. A process for the removal of gaseous sulfur compounds including sulfur dioxide from combustion gases formed in a combustion chamber and containing such compounds, said process comprising:
   (a) introducing into a boiler above the combustion zone of the combustion chamber, a pulverous solid selected from the group consisting of the carbonates, hydroxides and oxides of an alkaline earth metal such that any carbonates and hydroxides are converted to oxide by the heat of combustion and some of the oxide reacts with sulfur dioxide to form a solid sulfate reaction product;
   (b) flowing the resulting mixture of combustion gases, unreacted oxide, sulfate reaction product and sulfur dioxide upwardly along a vertically elongated reaction zone having a much longer length than cross-section with the effective length of the reaction zone being 10 times its diameter or more;
   (c) separately introducing water into the reaction zone;
   (d) flowing the mixture of combustion gases, sulfate reaction product, sulfur dioxide and water upwardly along the reaction zone to effect reaction of water with alkaline earth metal oxide which is a sorbent material to form alkaline earth metal hydroxide which is also a sorbent material and to effect reaction of the hydroxide with sulfur dioxide to form a solid particulate sulfite reaction product, the lengthy of said reaction zone and the gas velocity therein creating sufficient retention time in said reaction zone to permit said reactions to occur;
   (e) the mixture of combustion gases, sulfate reaction product, sulfur dioxide, water and sorbent material flows in a uniform manner with a similar velocity as the flue gases, and having the same residence time within the reaction zone for gases and sorbent material without recirculation of any of the sorbent material;
   (f) adjusting the amount of water introduced into said interaction zone such that the reaction products are particulate and essentially dry; and
   (g) wherein the molar ratio of introduced alkaline earth metal compound to sulfur in the combustion gases is 0.52 to 4.1 and wherein the reduction of the sulfur in the combustion gases is from 56% to 98%; and
   (h) separating the solid reaction product from the gases.

2. A process for the removal of gaseous sulfur compounds including sulfur dioxide from combustion gases formed in a combustion chamber and containing such compounds, said process comprising:
   introducing into the combustion gases at a location between the combustion zone of the combustion chamber and the vertical reaction zone identified hereinafter a pulverous solid selected from the group consisting of the carbonates, hydroxides and oxides of an alkaline earth metal such that any carbonates and hydroxides are converted to oxide by the heat of combustion and some of the oxide reacts with sulfur dioxide to form a solid sulfate reaction product;
   (b) flowing the resulting mixture of combustion gases, unreacted oxide, sulfate, reaction product and sulfur dioxide upwardly along a vertically elongated reaction zone having a much longer length than cross-section with the effective length of the reaction zone being 10 times its diameter or more;
   (c) separately introducing water into the reaction zone;
   (d) flowing the mixture of combustion gases, sulfate reaction product, sulfur dioxide and water upwardly along the reaction zone to effect reaction of water with alkaline earth metal oxide which is a sorbent material to form alkaline earth metal hydroxide which is also sorbent material and to effect reaction of the hydroxide which is also with sulfur dioxide to form a solid particulate sulfite reaction product, the length of said reaction zone and the gas velocity therein creating sufficient retention time in said reaction zone to permit said reactions to occur;

(e) the mixture of combustion gases, sulfate reaction product, sulfur dioxide, water and sorbent material flows in a uniform manner with a similar velocity as the flue gases, and having the same residence time within the reaction zone for gases and sorbent material without recirculation of any of the sorbent material;

(f) adjusting the amount of water introduced into said reaction zone such that the reaction products are particulate and essentially dry; and (g) wherein the molar ratio of introduced alkaline earth metal compound to sulfur in the combustion gases is 0.52 to 4.1 and wherein the reduction of the sulfur in the combustion gases is from 56% to 98%; and (h) separating the solid reaction product from the gases.

3. A process as in either claim 1 or 2 wherein the effective length of the reaction zone is 10 times its diameter.

4. A process as in either claim 1 or 2 wherein the temperature of the gases entering said reaction zone is in the range of 50 degrees C. to 800 degrees C.

5. A process as in claim 3 wherein the temperature of the gases entering said reaction zone is in the range of 90 degrees C. to 200 degrees C.

6. A process as in either claim 1 or 2 wherein the temperature of the gases entering said reaction zone is in the range of 90 degrees C. to 200 degrees C., the molar ratio of introduced alkaline earth metal compound to sulfur in the combustion gases is 0.52 to 4.1, and the resulting reduction in the sulfur content of the combustion gases is 70% to 95%.

7. A process as in either claim 1 or 2 wherein the molar ratio of introduced alkaline earth metal compound to sulfur in the combustion gases is 1.5 to 4.1.

8. A process for the removal of gaseous sulfur compounds including sulfur dioxide from a flowing stream of combustion gases containing such compounds, said process comprising: introducing into said flowing stream a pulverous solid selected from the group consisting of alkaline earth metal oxide and alkaline earth metal hydroxide; flowing the resulting mixture of combustion gases and pulverous solid upwardly into a vertically elongated reaction zone having a length at least 10 times its diameter; separately introducing water into the reaction zone; flowing the mixture of combustion gases, pulverous solid and water upwardly through the reaction zone to effect reaction of water with any alkaline earth metal oxide which is present to form alkaline earth metal hydroxide and to effect reaction of alkaline earth metal hydroxide with sulfur dioxide to form a solid particulate sulfite reaction product, the length of said reaction zone and the gas velocity therein creating sufficient retention time in said reaction zone to permit said reactions to occur, the solids being carried along with the gases through the reaction zone at a velocity not significantly less than the entering velocity and the molar ratio of introduced alkaline earth metal compound to sulfur in the combustion gases being 1.5 to 4.1 whereby the reduction of sulfur in the gases is separately introducing water into the reaction zone from 56% to 98%; and passing the entire stream of the gases and solids leaving the reaction zone to a gas-solids separation step where the solids are separated from the gases.

9. A process for the removal of gaseous sulfur compounds including sulfur dioxide from combustion gases formed in a combustion zone within a furnace and containing such compounds, said process comprising:

(a) introducing into the furnace at a location above the combustion zone a pulverous solid selected from the group consisting of the carbonates, hydroxides and oxides of an alkaline earth metal such that any carbonates and hydroxides which are present are converted to oxide by the heat of combustion and some of the oxide reacts with sulfur dioxide to form a solid sulfate reaction product;

(b) flowing the resulting mixture of combustion gases, unreacted oxide, sulfates reaction product and sulfur dioxide upwardly into a vertically elongated reaction zone having a length at least 10 times its diameter;

(c) separately introducing water into the reaction zone;

flowing the mixture of combustion gases, sulfate reaction product, sulfur dioxide and water upwardly through the reaction zone to effect reaction of water with alkaline earth metal oxide to form alkaline earth metal hydroxide and to effect reaction of the hydroxide with sulfur dioxide to form a solid particulate sulfite reaction product, the length of said reaction zone and the gas velocity therein creating sufficient retention time in said reaction zone to permit said reactions to occur, the solids being carried along with the gases through the reaction zone at a velocity not significantly less than the entering velocity and the molar ratio of introduced alkaline earth metal compound to sulfur in the combustion gases being 1.5 to 4.1 whereby the reduction of sulfur in the gases is from 56% to 98%;

(e) adjusting the amount of water introduced into the reaction zone such that the reaction products are particulate and essentially dry; and (f) passing the entire stream of the gases and solids leaving the reaction zone to a gas-solids separation step where the solids are separated from the gases.

* * * * *